C. L. JOHNSON.
TRANSMISSION LOCK.
APPLICATION FILED DEC. 17, 1920.
1,408,888.
Patented Mar. 7, 1922.
2 SHEETS—SHEET 1.
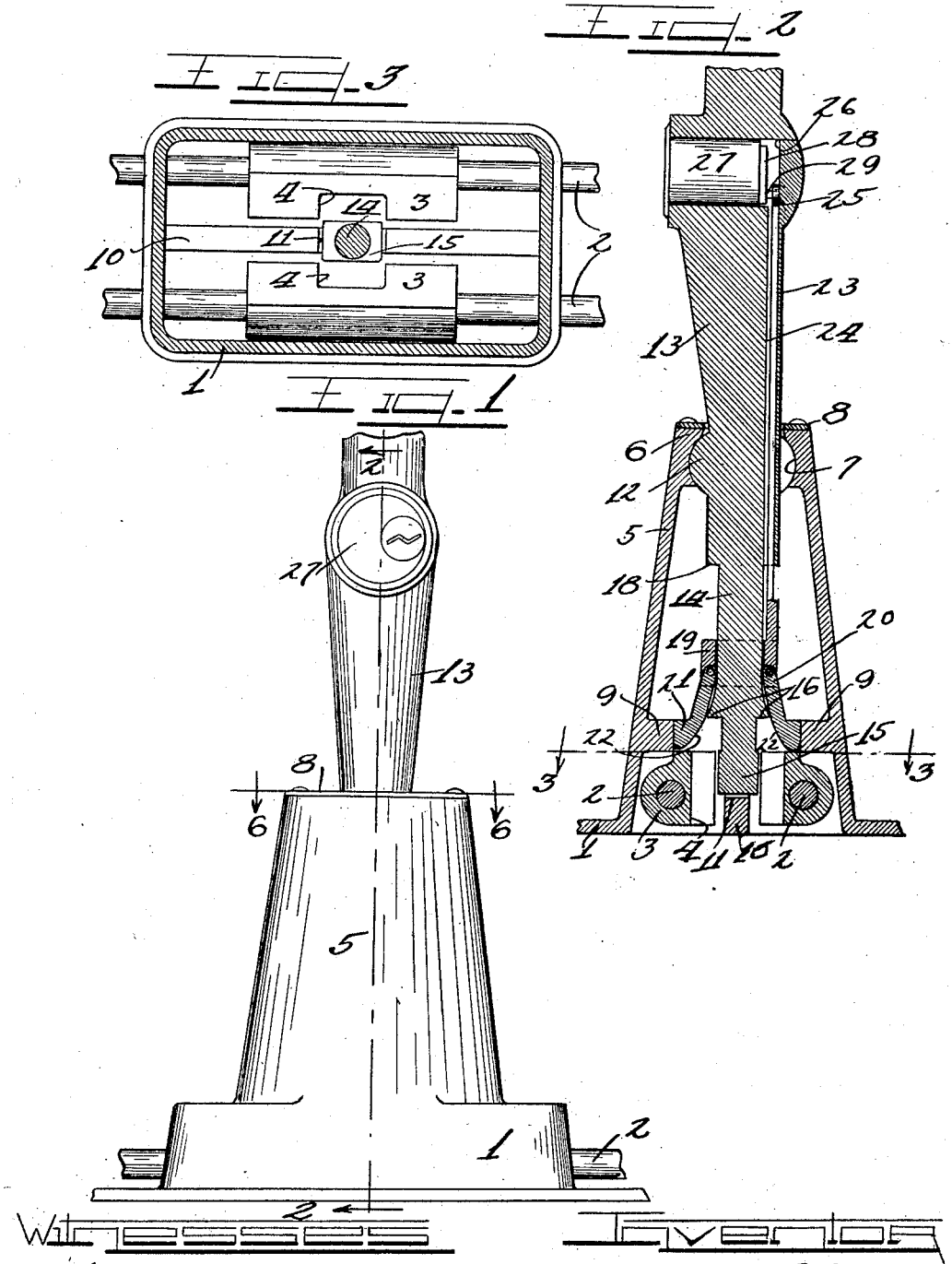

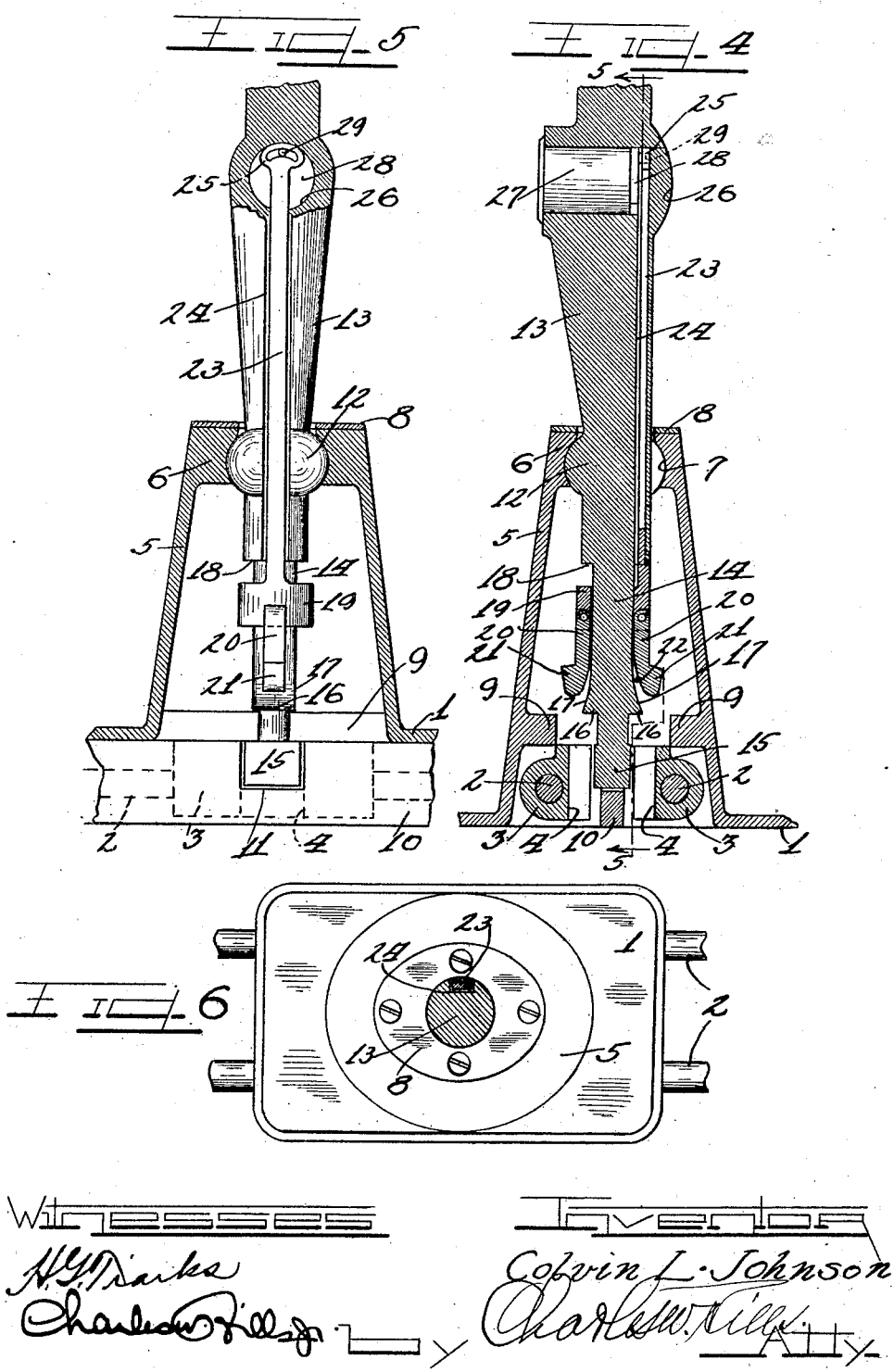

UNITED STATES PATENT OFFICE.

COLVIN L. JOHNSON, OF CHICAGO, ILLINOIS, ASSIGNOR TO JOHNSON AUTOMOBILE LOCK CO., OF CHICAGO, ILLINOIS, A CORPORATION OF ILLINOIS.

TRANSMISSION LOCK.

1,408,888. Specification of Letters Patent. Patented Mar. 7, 1922.

Application filed December 17, 1920. Serial No. 431,428.

*To all whom it may concern:*

Be it known that I, COLVIN L. JOHNSON, a citizen of the United States, and a resident of the city of Chicago, in the county of Cook and State of Illinois, have invented certain new and useful Improvements in a Transmission Lock; and I do hereby declare that the following is a full, clear, and exact description of the same, reference being had to the accompanying drawings, and to the numerals of reference marked thereon, which form a part of this specification.

This invention pertains more particularly to an improved type of a transmission or gear shift lever lock wherein a block slidably mounted on the lower end of the gear shift lever has a plurality of oppositely disposed locking arms or latches pivotally engaged thereon and adapted to be swung outwardly by a flaring portion of the gear shift lever when the supporting block is lowered to permit the pivoted latches to lockingly engage against horizontal partition plates or flanges formed in a supporting housing on the transmission box.

It is an object of this invention to provide a gear shift lever having a flaring portion near the lower end thereof adapted to actuate pivoted locking latches to move the latches into locking position when a key operated slide on the lever is actuated.

Another object of the invention is to provide a gear shift lever with pivotally supported locking members actuable by projections integrally formed on said lever.

A further object of the invention is the construction of a transmission lock wherein locking members pivotally suspended on a slidable block on the gear shift lever are adapted to be swung into locking position by projections formed on the lever.

It is an important object of this invention to provide a simple and improved form of gear shift lever lock wherein pivoted locking arms supported on a block slidable on the gear shift lever are adapted to be moved into locking position against stationary flange plates by means of teeth integrally formed on opposite sides and near the lower end of the gear shift lever.

Other and further important objects of this invention will be apparent from the disclosures in the specification and drawings.

The invention (in a preferred form) is illustrated in the drawings and hereinafter more fully described.

On the drawings:

Figure 1 is an elevation of a transmission housing and a gear shift lever equipped with a lock embodying the principles of this invention.

Figure 2 is a vertical section taken on line 2—2 of Figure 1, with parts shown in elevation.

Figure 3 is a sectional view taken on line 3—3, of Figure 2.

Figure 4 is a vertical section similar to that shown in Figure 2, but showing the locking latches in elevated or unlocked position.

Figure 5 is a sectional view taken on line 5—5 of Figure 4.

Figure 6 is a sectional plan view taken on line 6—6 of Figure 1.

As shown on the drawings:

The reference numeral 1 indicates a housing mounted upon the top of a transmission gear case (not shown). Projecting longitudinally through the housing are slidable gear shift rods 2, spaced a short distance apart and each having rigidly secured thereon within the housing 1, a block 3 having a notch 4 in the inner side thereof. Integrally formed or rigidly secured upon the top of the housing 1 and projecting upwardly therefrom is a hollow pedestal or conical casing 5, the upper wall 6 of which is provided with a ball shaped opening or socket 7. An apertured plate 8 is removably secured upon the top of the casing 5 by means of screws or other suitable means. Integrally formed within the lower portion of the casing 5 are two oppositely disposed horizontal plates or flanges 9. Rigidly secured centrally within the housing 1 is a vertical partition or plate 10, which extends longitudinally through the housing and is provided with a notch 11 in the upper central portion thereof.

Adjustably seated within the socket 7 is a ball portion 12 of a gear shift lever 13. The lever projects upwardly through the opening in the top plate 8. The lower portion of the lever 13 below the ball 12 forms a tail piece or actuating arm 14, the extreme lower end of which is shaped to afford a knob or head 15 which in the neutral position of the lever engages in the notch 11 of the housing partition plate 10 to prevent longitudinal swinging of the lever when in neutral position. Integrally formed on opposite sides of the lever tail piece 14 a short distance above the head 15 are two teeth, lugs or projections 16 which taper upwardly and afford concave guide surfaces 17.

Slidably mounted on the tail 14 between the teeth 16 and a shoulder 18 of the lever, is a supporting collar or centrally apertured block 19. Pivotally attached in notches of the collar 19 are the upper ends of two oppositely positioned latches or locking arms 20, the lower ends of which have integrally formed thereon locking heads or projections 21. The inner or rear surfaces 22 of the locking latches 20 are curved for co-action with the curved surfaces 17 of the teeth 16.

Rigidly secured or integrally connected to the collar 19 is the lower end of a long upwardly extending rod or bar 23, which is slidably disposed with a longitudinal groove or slot 24, provided in one side of the gear shift lever 13 and its tail 14. The upper end of the bar 23 has a slotted head 25 formed thereon which is disposed within a chamber or opening 26 formed within the gear shift lever 13 above the supporting casing 5. Mounted within the lever chamber 26 is a pin lock 27, the barrel 28 of which is provided with an eccentric pin 29 which projects into the slot of the head 25 formed on the upper end of the bar 23.

The operation is as follows:

In the neutral vertical position of the gear shift lever 13, the tail piece 14 projects downwardly so that the head 15 thereof engages in the notch 11 of the housing partition wall 10, as shown in Figures 4 and 5. To shift the gears of the transmission a composite movement of the gear shift lever 13 is necessary, that is, the lever must be thrown to one side and either forwardly or rearwardly to permit the lever tail head 15 to move out of the partition wall notch 11 and into the notch 4 of one of the gear shift blocks 3 to cause shifting of the gears.

In the unlocked position of the gear shift lever 13 the pin 29 of the pin lock 27 is in its uppermost position holding the latch bar 23 and the collar 19 elevated with the pivoted latches 20 hanging in release position as shown in Figure 4 out of engagement with the teeth 16. To lock the gear shift lever 13 against movement, the lever is first moved into vertical neutral position. A key is then inserted in the key slot of the pin lock 27 and the barrel 28 is rotated to cause the pin 29 to move in the slotted head 25, thereby forcing the latch bar 23 and the collar 19 downwardly. Downward movement of the collar 19 causes the pivoted latches 20 to slidably engage the concave surfaces of the teeth 16, whereby the free ends of said latches are automatically swung outwardly to permit the locking heads 21 thereof to contact the inner sides of the stationary flanges 9, as shown in Figure 2. The lever 13 is thus locked in neutral position against movement, thereby preventing theft of an automobile equipped with the improved lock, and also preventing interference with the automobile gear shift mechanisms by unauthorized persons.

To unlock the device it is only necessary to insert the key in the key slot of the lock 27, and by turning the barrel 28 the lock pin 29 acts to draw the latch bar 23 and the collar 19 upwardly into release position. Upward movement of the collar 19 carries the pivoted latches 20 upwardly out of engagement with the casing flanges 9. In the release position of the latches 20 they clear the teeth 16 and fall by gravity against the sides of the tail piece 14 of the gear shift lever.

I am aware that numerous details of construction may be varied through a wide range without departing from the principles of this invention, and I therefore do not purpose limiting the patent granted otherwise than necessitated by the prior art.

I claim as my invention:

1. In a gear shift lever lock of the class described the combination with a gear shift lever, of locking means therein, pivoted locking members slidably supported on the lever and actuable by said locking means, and stationary means adapted to be engaged by said pivoted members to hold the gear shift lever locked from movement.

2. In a device of the class described the combination with a gear shift lever, of locking means therein, a collar slidable on said lever and connected with said locking means, locking latches pivotally connected to said collar, and members adapted to be engaged by said locking latches to hold the gear shift lever locked against movement.

3. In a device of the class described the combination with a gear shift lever, of a collar slidably engaged thereon, means for supporting said lever, flanges formed therein on opposite sides of the lever, projections integrally formed on said lever, latching members movably attached to said collar, and key operated means within said lever and connected with said collar to move the same downwardly to cause the latching members to contact and slide outwardly on the lever projections into locking engagement with said flanges.

4. In a gear shift lever lock the combination with a gear shift lever, of means slidably mounted thereon, and locking members pivotally attached to said means.

5. In a gear shift lever lock the combination with a gear shift lever, of projections integrally formed thereon, means slidably engaged on said lever above said projections, and locking members pivotally connected with said means and adapted to slide outwardly on said projections into locking position when said means is lowered.

6. In a gear shift lever lock the combination with a gear shift lever, of projections formed on opposite sides thereof, a collar slidably engaged on said lever above said projections, means on said lever for actuating said collar, and locking members pivoted on said collar and adapted to contact said projections and swing outwardly into locking position when said collar is lowered by said means.

7. The combination with a ball gear shift lever, of a casing having a socket therein for receiving the ball portion of said lever, flanges formed in said casing on opposite sides of the lever, pivoted locking members mounted on the lower end of said lever within said casing, projections formed on opposite sides of the lower end of said lever, and key operated means within said lever adapted to lower said locking members into engagement with said projections to cause outward swinging of said locking members into locking engagement with the casing flanges to hold the lever locked against movement in neutral position.

8. In a gear shift lever lock the combination with a pair of stationary plates, of a gear shift lever projecting therebetween, a member slidably mounted on said lever, latches pivoted thereon, and means on said lever for moving said latches into locking engagement with said stationary plates when said member is lowered on said lever.

In testimony whereof I have hereunto subscribed my name in the presence of two subscribing witnesses.

COLVIN L. JOHNSON.

Witnesses:
　EARL M. HARDINE,
　CARLTON HILL.